United States Patent [19]
Carpenter et al.

[11] Patent Number: 6,115,804
[45] Date of Patent: *Sep. 5, 2000

[54] NON-UNIFORM MEMORY ACCESS (NUMA) DATA PROCESSING SYSTEM THAT PERMITS MULTIPLE CACHES TO CONCURRENTLY HOLD DATA IN A RECENT STATE FROM WHICH DATA CAN BE SOURCED BY SHARED INTERVENTION

[75] Inventors: Gary Dale Carpenter, Pflugerville; Mark Edward Dean; David Brian Glasco, both of Austin, all of Tex.

[73] Assignee: International Business Machines Corporation, Armonk, N.Y.

[ * ] Notice: This patent is subject to a terminal disclaimer.

[21] Appl. No.: 09/248,503

[22] Filed: Feb. 10, 1999

[51] Int. Cl.$^7$ ................................................. G06F 15/00
[52] U.S. Cl. ........................... 712/28; 711/119; 711/122; 711/130; 711/141; 710/104
[58] Field of Search ................................. 711/119, 122, 711/130, 141; 712/28; 710/104

[56] References Cited

U.S. PATENT DOCUMENTS

| | | | |
|---|---|---|---|
| 5,673,413 | 9/1997 | Deshpande et al. | 711/141 |
| 5,878,268 | 3/1999 | Hagersten | 712/28 |
| 5,893,144 | 4/1999 | Wood et al. | 711/122 |
| 5,940,856 | 8/1999 | Arimilli et al. | 711/119 |
| 5,940,864 | 8/1999 | Arimilli et al. | 711/163 |
| 5,943,684 | 8/1999 | Arimilli et al. | 711/144 |
| 5,943,685 | 8/1999 | Arimilli et al. | 711/146 |
| 5,963,974 | 10/1999 | Arimilli et al. | 711/130 |

*Primary Examiner*—John A. Follansbee
*Assistant Examiner*—Nabil El-Hady
*Attorney, Agent, or Firm*—Casimer K. Salys; Felsman, Bradley, Vaden, Gunter & Dillon, LLP

[57] ABSTRACT

A non-uniform memory access (NUMA) computer system includes first and second processing nodes that are each coupled to a node interconnect. The first processing node includes a system memory and first and second processors that each have a respective one of first and second cache hierarchies, which are coupled for communication by a local interconnect. The second processing node includes at least a system memory and a third processor having a third cache hierarchy. The first cache hierarchy and the third cache hierarchy are permitted to concurrently store an unmodified copy of a particular cache line in a Recent coherency state from which the copy of the particular cache line can be sourced by shared intervention. In response to a request for the particular cache line by the second cache hierarchy, the first cache hierarchy sources a copy of the particular cache line to the second cache hierarchy by shared intervention utilizing communication on only the local interconnect and without communication on the node interconnect.

10 Claims, 2 Drawing Sheets

NON-UNIFORM MEMORY ACCESS (NUMA) DATA PROCESSING SYSTEM THAT PERMITS MULTIPLE CACHES TO CONCURRENTLY HOLD DATA IN A RECENT STATE FROM WHICH DATA CAN BE SOURCED BY SHARED INTERVENTION

CROSS-REFERENCE TO RELATED APPLICATIONS

This application is related to the following patent applications:

(1) Ser. No. 08/837,516, "Cashe Intervention from only one of many Cache Lines sharing an unmodified value," which was filed on Apr. 14, 1997, now U.S. Pat. No. 5,940,856 issued on Aug. 17, 1999, and incorporated herein by reference.

(2) Ser. No. 09/024,307, "Apparatus and Method of maintaining Cache Coherency in A multi-Processor Computer System with Global and Local Recently Read States," which was filed on Feb. 17, 1998, now U.S. Pat. No. 6,018,791 issued on Jan. 25, 2001 and incorporated herein by reference.

(3) Ser. No. 09/213,997 "Non-Uniform Memory Access (NUMA) Data Processing System with Multiple Caches Concurrently Holding Data In A Recent State From Data Can Be Sourced by Sharing Intervention." which was filed on Dec. 17, 1997, and incororated herein by reference.

BACKGROUND OF THE INVENTION

1. Technical Field

The present invention relates in general to a method and system for data processing and, in particular, to data processing within a non-uniform memory access (NUMA) data processing system. Still more particularly, the present invention relates to a NUMA data processing system and a method in a NUMA data processing system of supplying requested data by shared intervention.

2. Description of the Related Art

It is well-known in the computer arts that greater computer system performance can be achieved by harnessing the processing power of multiple individual processors in tandem. Multi-processor (MP) computer systems can be designed with a number of different topologies, of which various ones may be better suited for particular applications depending upon the performance requirements and software environment of each application. One of the most common MP computer topologies is a symmetric multi-processor (SMP) configuration in which multiple processors share common resources, such as a system memory and input/output (I/O) subsystem, which are typically coupled to a shared system interconnect. Such computer systems are said to be symmetric because all processors in an SMP computer system ideally have the same access latency with respect to data stored in the shared system memory.

Although SMP computer systems permit the use of relatively simple inter-processor communication and data sharing methodologies, SMP computer systems have limited scalability. In other words, while performance of a typical SMP computer system can generally be expected to improve with scale (i.e., with the addition of more processors), inherent bus, memory, and input/output (I/O) bandwidth limitations prevent significant advantage from being obtained by scaling a SMP beyond a implementation-dependent size at which the utilization of these shared resources is optimized. Thus, the SMP topology itself suffers to a certain extent from bandwidth limitations, especially at the system memory, as the system scale increases. SMP computer systems also do not scale well from the standpoint of manufacturing efficiency. For example, although some components can be optimized for use in both uniprocessor and small-scale SMP computer systems, such components are often inefficient for use in large-scale SMPs. Conversely, components designed for use in large-scale SMPs are impractical for use in smaller systems from a cost standpoint.

As a result, an MP computer system topology known as non-uniform memory access (NUMA) has emerged as an alternative design that addresses many of the limitations of SMP computer systems at the expense of some additional complexity. A typical NUMA computer system includes a number of interconnected nodes that each include one or more processors and a local "system" memory. Such computer systems are said to have a non-uniform memory access because each processor has lower access latency with respect to data stored in the system memory at its local node than with respect to data stored in the system memory at a remote node. NUMA systems can be further classified as either non-coherent or cache coherent, depending upon whether or not data coherency is maintained between caches in different nodes. The complexity of cache coherent NUMA (CC-NUMA) systems is attributable in large measure to the additional communication required for hardware to maintain data coherency not only between the various levels of cache memory and system memory within each node but also between cache and system memories in different nodes. NUMA computer systems do, however, address the scalability limitations of conventional SMP computer systems since each node within a NUMA computer system can be implemented as a smaller SMP system. Thus, the shared components within each node can be optimized for use by only a few processors, while the overall system benefits from the availability of larger scale parallelism while maintaining relatively low latency.

A principal performance concern with CC-NUMA computer systems is the latency associated with communication transactions transmitted via the interconnect coupling the nodes. In particular, read-type transactions, which are by far the most common type of transaction, may have twice the latency when targeting data resident in remote system memory as compared to read transactions targeting data resident in local system memory. Because of the relatively high latency associated with read transactions transmitted on the nodal interconnect versus read transactions on the local interconnects, it is useful and desirable to reduce the number of read-type transactions required to be transmitted over the nodal interconnect and as well as to reduce the latency of such remote read-type transactions.

SUMMARY OF THE INVENTION

In accordance with the present invention, the number and latency of read requests in a non-uniform memory access (NUMA) computer system is reduced by supporting shared intervention. A NUMA computer system in accordance with the present invention includes at least first and second processing nodes that are each coupled to a node interconnect. The first processing node includes a system memory and first and second processors that each have a respective one of first and second cache hierarchies, which are coupled for communication by a local interconnect. The second processing node includes at least a system memory and a third processor having a third cache hierarchy. The first cache hierarchy and the third cache hierarchy are permitted to concurrently store an unmodified copy of a particular cache line in a Recent coherency state from which the copy of the particular cache line can be sourced by shared intervention. In response to a request for the particular cache line by the second cache hierarchy, the first cache hierarchy sources a copy of the particular cache line to the second cache hierarchy by shared intervention utilizing communication on only the local interconnect and without communication on the node interconnect.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

System Overview

Figure 1:
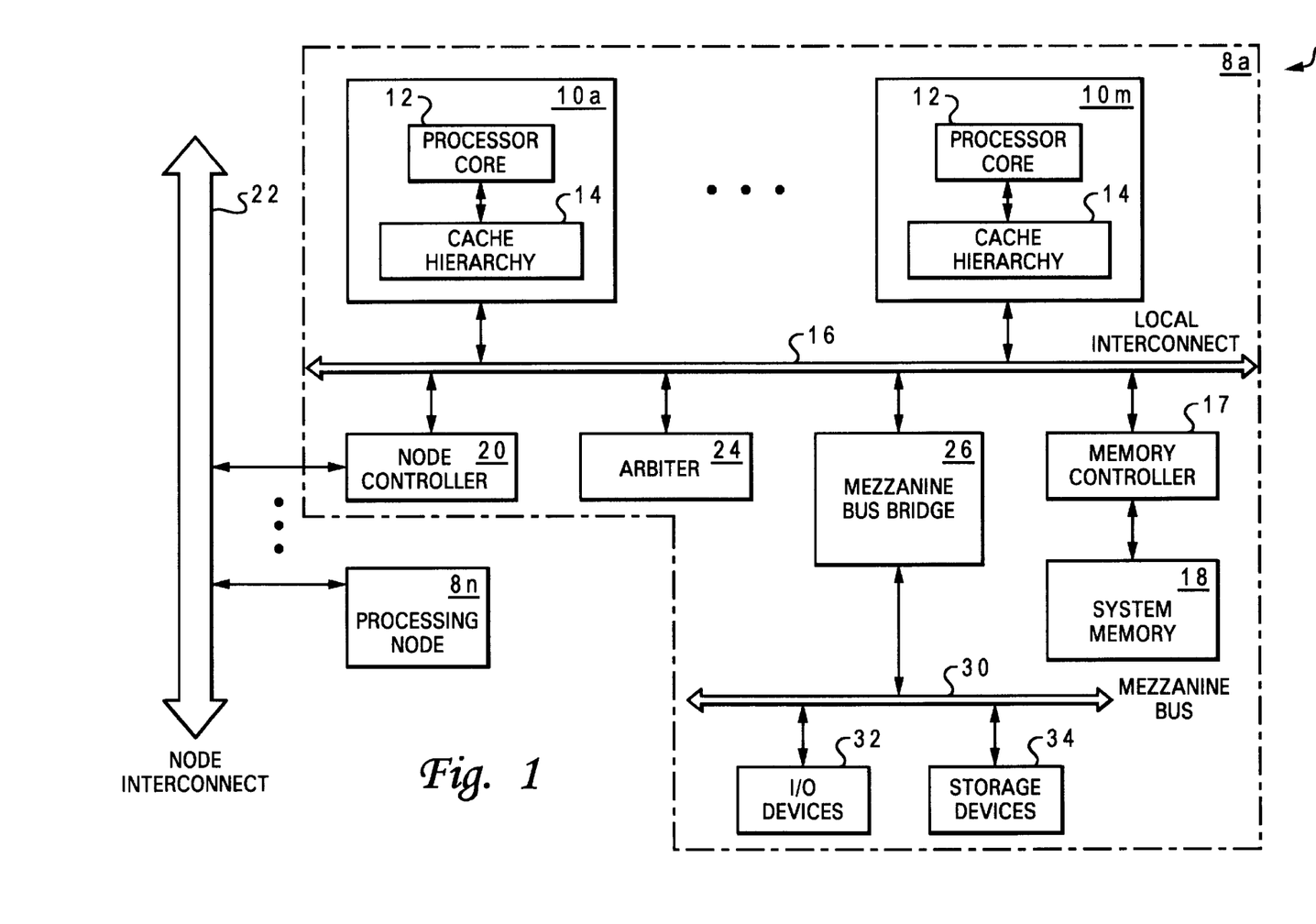
FIG. 1 depicts an illustrative embodiment of a NUMA computer system in accordance with the present invention.

With reference now to the figures and in particular with reference to FIG. 1, there is depicted an illustrative embodiment of a NUMA computer system in accordance with the present invention. The depicted embodiment can be realized, for example, as a workstation, server, or mainframe computer. As illustrated, NUMA computer system 6 includes a number (N≧2) of processing nodes 8a–8n, which are interconnected by node interconnect 22. Processing nodes 8a–8n may each include M (M≧0) processors 10, a local interconnect 16, and a system memory 18 that is accessed via a memory controller 17. Processors 10a–10m are preferably (but not necessarily) identical and may comprise a processor within the PowerPC™ line of processors available from International Business Machines (IBM) Corporation of Armonk, New York. In addition to the registers, instruction flow logic and execution units utilized to execute program instructions, which are generally designated as processor core 12, each of processors 10a–10m also includes an on-chip cache hierarchy that is utilized to stage data to the associated processor core 12 from system memories 18. Each cache hierarchy 14 includes at least one level of cache and may include, for example, a level one (L1) cache and a level two (L2) cache having storage capacities of between 8–32 kilobytes (kB) and 1–16 megabytes (MB), respectively. As is conventional, such caches are managed by a cache controller that, among other things, implements a selected cache line replacement scheme and a coherency protocol. In the present disclosure, each processor 10 and its associated cache hierarchy 14 is considered to be a single snooper.

Each of processing nodes 8a–8n further includes a respective node controller 20 coupled between local interconnect 16 and node interconnect 22. Each node controller 20 serves as a local agent for remote processing nodes 8 by performing at least two functions. First, each node controller 20 snoops the associated local interconnect 16 and facilitates the transmission of local communication transactions (e.g., read-type requests) to remote processing nodes 8. Second, each node controller 20 snoops communication transactions on node interconnect 22 and masters relevant communication transactions on the associated local interconnect 16. Communication on each local interconnect 16 is controlled by an arbiter 24. Arbiters 24 regulate access to local interconnects 16 based on bus request signals generated by processors 10 and compile coherency responses for snooped communication transactions on local interconnects 16, as discussed further below.

Local interconnect 16 is coupled, via mezzanine bus bridge 26, to a mezzanine bus 30, which may be implemented as a Peripheral Component Interconnect (PCI) local bus, for example. Mezzanine bus bridge 26 provides both a low latency path through which processors 10 may directly access devices among I/O devices 32 and storage devices 34 that are mapped to bus memory and/or I/O address spaces and a high bandwidth path through which I/O devices 32 and storage devices 34 may access system memory 18. I/O devices 32 may include, for example, a display device, a keyboard, a graphical pointer, and serial and parallel ports for connection to external networks or attached devices. Storage devices 34, on the other hand, may include optical or magnetic disks that provide non-volatile storage for operating system and application software.

Memory Organization

All of processors 10 in NUMA computer system 6 share a single physical memory space, meaning that each physical address is associated with only a single location in one of system memories 18. Thus, the overall contents of the system memory, which can generally be accessed by any processor 10 in NUMA computer system 6, can be viewed as partitioned between system memories 18. For example, in an illustrative embodiment of the present invention having four processing nodes 8, NUMA computer system may have a 16 gigabyte (GB) physical address space including both a general purpose memory area and a reserved area. The general purpose memory area is divided into 500 MB segments, with each of the four processing nodes 8 being allocated every fourth segment. The reserved area, which may contain approximately 2 GB, includes system control and peripheral memory and I/O areas that are each allocated to a respective one of processing nodes 8.

For purposes of the present discussion, the processing node 8 that stores a particular datum in its system memory 18 is said to be the home node for that datum; conversely, others of processing nodes 8a–8n are said to be remote nodes with respect to the particular datum.

Memory Coherency

Because data stored within each system memory 18 can be requested, accessed, and modified by any processor 10 within NUMA computer system 6, NUMA computer system 6 implements a cache coherence protocol to maintain coherence both between caches in the same processing node and between caches in different processing nodes. Thus, NUMA computer system 6 is properly classified as a CC-NUMA computer system. The specific cache coherence protocol that is implemented is implementation-dependent, but in a preferred embodiment of the present invention comprises a variant of the well-known Modified, Exclusive, Shared, Invalid (MESI) protocol that includes a fifth R (Recent) state, as discussed in detail in the above-referenced co-pending applications. As discussed in detail below, the R state permits a cache holding an unmodified cache line that may be shared to source the cache line directly to another cache in response to a read-type request (e.g., a READ or Read-with-Intent-to-Modify (RWITM)).

Hereafter, it will be assumed that cache hierarchies 14 and arbiters 24 implement the conventional R-MESI protocol, of which node controllers 20 recognize the M, S and I states and consider the E state to be merged into the M state and the R state to be merged into the S state. That is, node controllers 20 assume that data held exclusively by a remote cache has been modified, whether or not the data has actually been modified, and do not distinguish between the S and R states for remotely held data.

Interconnect Architecture

Local interconnects 16 and node interconnect 22 can each be implemented with any bus-based broadcast architecture, switch-based broadcast architecture, or switch-based non-broadcast architecture. However, in a preferred embodiment, at least node interconnect 22 is implemented as a switch-based non-broadcast interconnect governed by the 6xx communication protocol developed by IBM Corporation. Local interconnects 16 and node interconnect 22 permit split transactions, meaning that no fixed timing relationship exists between the address and data tenures comprising a communication transaction and that data packets can be ordered differently than the associated address packets. The utilization of local interconnects 16 and node interconnect 22 is also preferably enhanced by pipelining communication transactions, which permits a subsequent communication transaction to be sourced prior to the master of a previous communication transaction receiving coherency responses from each recipient.

Regardless of the type or types of interconnect architecture that are implemented, at least three types of "packets" (packet being used here generically to refer to a discrete unit of information)—address, data, and coherency response—are utilized to convey information between processing nodes 8 via node interconnect 22 and between snoopers via local interconnects 16. Referring now to Tables I and II, a summary of relevant fields and definitions are given for address and data packets, respectively.

TABLE I

| Field Name | Description |
| --- | --- |
| Address <0:7> | Modifiers defining attributes of a communication transaction for coherency, write thru, and protection |
| Address <8:15> | Tag used to identify all packets within a communication transaction |
| Address <16:63> | Address portion that indicates the physical, virtual or I/O address in a request |
| Aparity <0:2> | Indicates parity for address bits <0:63> |
| TDescriptors | Indicate size and type of communication transaction |

TABLE II

| Field Name | Description |
| --- | --- |
| Data <0:127> | Data for read and write transactions |
| Data parity <0:15> | Indicates parity for data lines <0:127> |
| DTag <0:7> | Tag used to match a data packet with an address packet |
| DValid <0:1> | Indicates if valid information is present in Data and DTag fields |

As indicated in Tables I and II, to permit a recipient node or snooper to determine the communication transaction to which each packet belongs, each packet in a communication transaction is identified with a transaction tag. Those skilled in the art will appreciate that additional flow control logic and associated flow control signals may be utilized to regulate the utilization of the finite communication resources.

Within each processing node 8, status and coherency responses are communicated between each snooper and the local arbiter 24. The signal lines within local interconnects 16 that are utilized for status and coherency communication are summarized below in Table

TABLE III

| Signal Name | Description |
| --- | --- |
| AStatOut <0:1> | Encoded signals asserted by each bus receiver to indicate flow control or error information to arbiter |
| AStatIn <0:1> | Encoded signals asserted by arbiter in response to tallying the AStatOut signals asserted by the bus receivers |
| ARespOut <0:2> | Encoded signals asserted by each bus receiver to indicate coherency information to arbiter |
| ARespIn <0:2> | Encoded signals asserted by arbiter in response to tallying the ARespOut signals asserted by the bus receivers |

Status and coherency responses transmitted via the AResp and AStat lines of local interconnects 16 preferably have a fixed but programmable timing relationship with the associated address packets. For example, the AStatOut votes, which provide a preliminary indication of whether or not each snooper has successfully received an address packet transmitted on local interconnect 16, may be required in the second cycle following receipt of the address packet. Arbiter 24 compiles the AStatOut votes and then issues the AStatIn vote a fixed but programmable number of cycles later (e.g., 1 cycle). Possible AStat votes are summarized below in Table IV.

TABLE IV

| AStat vote | Meaning |
| --- | --- |
| Null | Idle |
| Ack | Transaction accepted by snooper |
| Error | Parity error detected in transaction |
| Retry | Retry transaction, usually for flow control |

Following the AStatIn period, the ARespOut votes may then be required a fixed but programmable number of cycles (e.g., 2 cycles) later. Arbiter 24 also compiles the ARespOut votes of each snooper and delivers an ARespIn vote, preferably during the next cycle. The possible AResp votes preferably include the coherency responses listed in Table V, which lists such AResp votes in order of descending priority.

TABLE V

| Coherency responses | Meaning |
| --- | --- |
| Retry | Source of request must retry transaction -- usually for flow control reasons |
| Modified intervention | Line is modified in cache and will be sourced from cache to requestor |

TABLE V-continued

| Coherency responses | Meaning |
| --- | --- |
| Shared intervention | Line is unmodified in cache (and possibly shared) and will be sourced from cache to requestor |
| ReRun | Snooped request has long latency and source of request will be instructed to reissue transaction at a later time |
| Shared | Line is held shared in cache |
| Null | Line is invalid in cache |

The ReRun AResp vote, which is usually issued by a node controller 20, indicates that the snooped request has a long latency (e.g., the request will be serviced by a processor 10 or system memory 18 at a remote processing node 8) and that the source of the request will be instructed to reissue the transaction at a later time. Thus, in contrast to a Retry AResp vote, a ReRun makes the recipient of a transaction that voted ReRun (and not the originator of the transaction) responsible for causing the communication transaction to be reissued at a later time.

Node Controller

Figure 2:
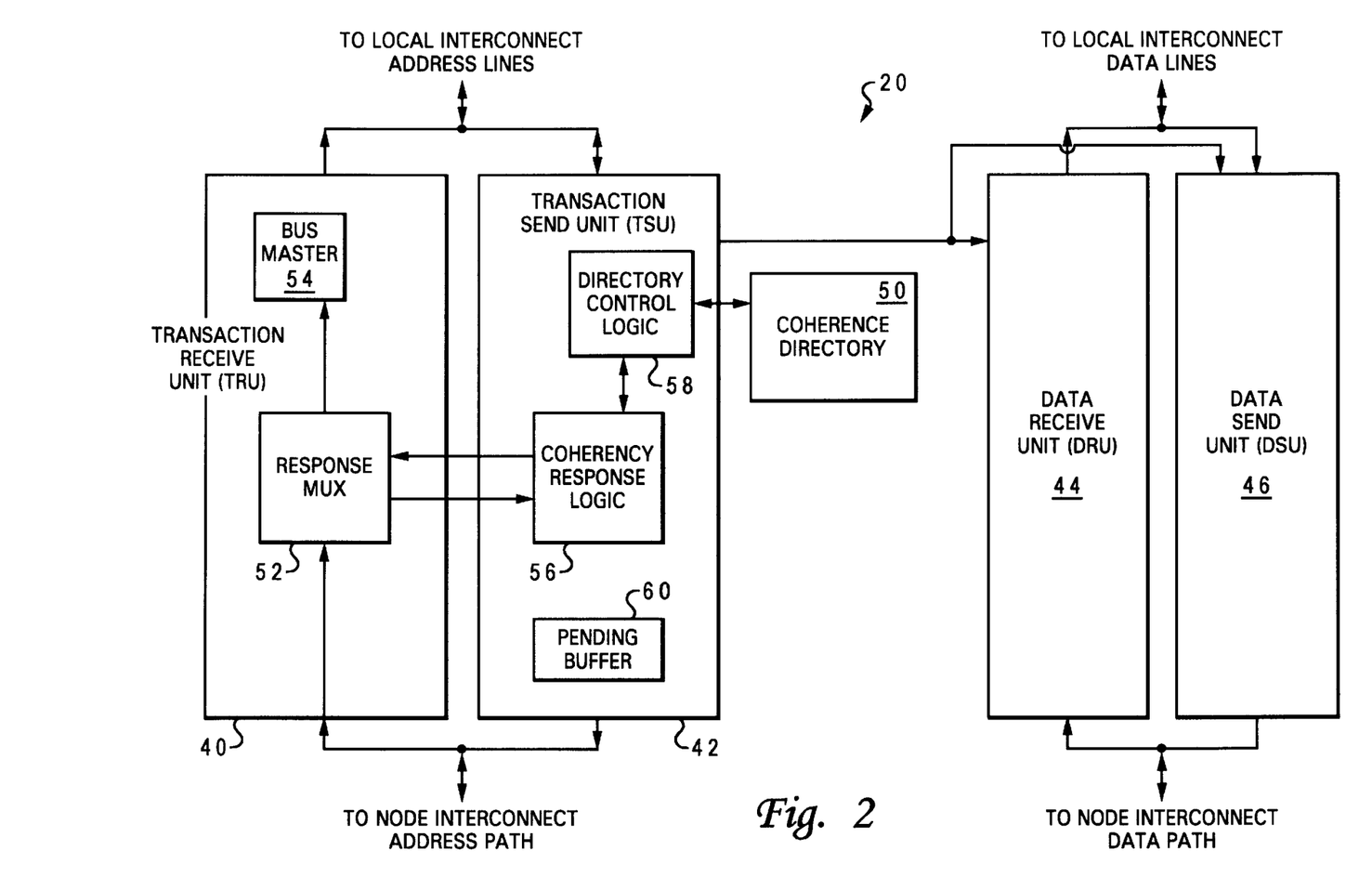
FIG. 2 is a more detailed block diagram of the node controller shown in FIG. 1.

Referring now to FIG. 2, there is illustrated a more detailed block diagram of a node controller 20 in NUMA computer system 6 of FIG. 1. As shown in FIG. 2, each node controller 20, which is coupled between a local interconnect 16 and node interconnect 22, includes a transaction receive unit (TRU) 40, a transaction send unit (TSU) 42, a data receive unit (DRU) 44, and a data send unit (DSU) 46. TRU 40, TSU 42, DRU 44 and DSU 46 can be implemented, for example, with field programmable gate arrays (FPGAs) or application specific integrated circuits (ASICs). As indicated, the address and data paths through node controller 20 are bifurcated, with address (and coherency) packets being processed by TRU 40 and TSU 42 and data packets being processed by DSU 44 and DRU 46.

TRU 40, which is so designated to indicate transaction flow off of node interconnect 22, is responsible for accepting address and coherency packets from node interconnect 22, issuing transactions on local interconnect 16, and forwarding responses to TSU 42. TRU 40 includes response multiplexer (mux) 52, which receives packets from node interconnect 22 and passes selected packets to both bus master 54 and coherency response logic 56 within TSU 42. In response to receipt of a address packet from response multiplexer 52, bus master 54 can initiate a communication transaction on its local interconnect 16 that is the same as or different from the type of communication transaction indicated by the received address packet.

TSU 42, which as indicated by its nomenclature is a conduit for transactions flowing onto node interconnect 22, includes a multiple-entry pending buffer 60 that temporarily stores attributes of communication transactions sourced onto node interconnect 22 that have yet to be completed. The transaction attributes stored in an entry of pending buffer 60 preferably include at least the address (including tag) of the transaction, the type of the transaction, and the number of expected coherency responses. Each pending buffer entry has an associated status, which can be set either to Null, indicating that the pending buffer entry can be deleted, or to ReRun, indicating that the transaction is still pending. In addition to sourcing address packets on node interconnect 22, TSU 42 interacts with TRU 40 to process memory request transactions and issues commands to DRU 44 and DSU 46 to control the transfer of data between local interconnect 16 and node interconnect 22. TSU 42 also implements the selected (i.e., MSI) coherency protocol for node interconnect 22 with coherency response logic 56 and maintains coherence directory 50 with directory control logic 58.

Coherence directory 50 stores indications of the system memory addresses of data (e.g., cache lines) checked out to caches in remote nodes for which the local processing node is the home node. The address indication for each cache line is stored in association with an identifier of each remote processing node having a copy of the cache line and the coherency status of the cache line at each such remote processing node. Possible coherency states for entries in coherency directory 50 are summarized in Table VI.

TABLE VI

| Coherence directory state | Possible state(s) in local cache | Possible state(s) in remote cache | Meaning |
| --- | --- | --- | --- |
| Modified (M) | I | M, E, or I | Cache line may be modified at a remote node with respect to system memory at home node |
| Shared (S) | R, S or I | R, S or I | Cache line may be held non-exclusively at remote node |
| Invalid (I) | R, M, E, S, or I | I | Cache line is not held by any remote node |
| Pending-shared | R, S or I | R, S or I | Cache line is in the process of being invalidated at remote nodes |
| Pending-modified | I | M, E, or I | Cache line, which may be modified remotely, is in process of being written back to system memory at home node, possibly with invalidation at remote node |

As indicated in Table VI, the knowledge of the coherency states of cache lines held by remote processing nodes is imprecise. This imprecision is due to the fact that a cache line held remotely can make a transition from R, S or E to I or from E to M without notifying the node controller 20 of the home node.

Shared intervention Overview

In order to decrease latency of processor read-type requests, the present invention supports shared intervention, that is, the sourcing of data by a cache holding the data in an unmodified (i.e., E or R) state in response to a read-type request. Because multiple caches within NUMA computer system 6 may concurrently hold the same unmodified cache line, some mechanism is required to regulate which cache sources the requested cache line by shared intervention. As described in the above-referenced co-pending applications, that mechanism is the R (Recent) cache coherency state. In accordance with the present invention, only one cache hierarchy 14 in a particular processing node 8 can hold a particular cache line in the R state at any one time; however, cache hierarchies 14 in multiple processing nodes 8 may concurrently hold the same cache line in the R state.

The present invention supports shared intervention of a cache line held in either R state or E state in response to all READ transactions and supports shared intervention of cache lines held in E state in response to RWITM transactions. Shared intervention of cache lines held in the R state in response to RWITM transactions is preferably disabled because such RWITM transactions must be made visible to all processing nodes 8 in order to maintain coherency. Absent the disabling of shared intervention for R state cache lines requested by RWITM transactions, additional transaction overhead would be required to inform other processing nodes 8 of RWITM transactions serviced locally via shared intervention, and this additional transaction overhead would greatly diminish, if not eliminate, the performance benefits of shared intervention.

Coherence State of Requested Cache Line at Requesting Cache Hierarchy

In response to receipt of a cache line requested utilizing a RWITM transaction, the requesting cache hierarchy 14 always stores the cache line in the Modified state. However, the coherence state of a cache line obtained in response to a READ transaction depends upon the source of the requested cache line. Table VII, below, summarizes the state transitions at a cache hierarchy 14 that issues a READ transaction requesting a cache line following a read miss.

TABLE VII

| Master state transition | ARespIn vote received | Data source |
| --- | --- | --- |
| I→R | Shared | system memory or node controller |
| I→E | Null | system memory or node controller |
| I→R | Shared intervention | snooper |
| I→R | Modified intervention | snooper |

As indicated, if cache hierarchy 14 receives an ARespIn Shared coherency vote, the cache controller of cache hierarchy 14 "knows" that no other snooper in the same processing node 8 holds the requested cache line in R state or M state and that the requested cache line will be supplied by either the local system memory 18 or a remote system memory 18 via node controller 20. Accordingly, when requesting cache hierarchy 14 receives the requested cache line via local interconnect 16, the cache controller of cache hierarchy 14 caches the requested cache line and sets its coherency state to Recent, meaning that, of the multiple local cache hierarchies 14 holding the requested cache line, the requesting cache hierarchy 14 is responsible for sourcing the requested cache line by Shared intervention.

If the requesting cache hierarchy 14 receives an ARespIn Null coherency vote in response to the read request, the cache controller of the requesting cache hierarchy 14 "knows" that no local cache hierarchy 14 stores a copy of the requested cache line and that the requested cache line will be sourced by either the local system memory 18 or a remote system memory via node controller 20. When the requested cache line is received by requesting cache hierarchy 14, the requested cache line is cached in the Exclusive state.

If the requesting cache hierarchy 14 receives an ARespIn Shared intervention or Modified intervention vote, the cache controller at requesting processor 10 "knows" that the requested cache line will be sourced by another snooper in the same processing node 10, and upon receipt of the requested cache line stores it in the R state.

Coherence State of Requested Cache Line at Snooping Cache Hierarchy

A cache hierarchy 14 snooping a RWITM transaction always updates the coherence state of its copy of the requested cache line, if any, to the Invalid state. The state transitions of a snooping cache hierarchy 14 in response to receipt of a READ transaction according to a preferred embodiment are summarized below in Table VIII.

TABLE VIII

| Snooper state or state transition | Snooper ARespOut vote |
| --- | --- |
| I | Null |
| E, R → S | Shared intervention |
| M → S | Modified intervention |
| S | Shared |

As shown in Table VIII, if a cache hierarchy 14 snoops a READ request and holds the requested cache line in either Exclusive state or Recent state, the snooping cache hierarchy 14 provides a Shared intervention ARespOut vote, sources the requested cache line on local interconnect 16 in response to receipt of a Shared intervention ARespIn vote from arbiter 24, and updates the coherency state of its copy of the requested cache line to Shared state. Similarly, if a cache hierarchy 14 snoops a read request issued by a local processor 10 and holds the requested cache line in Modified state, the snooping cache hierarchy 14 provides a Modified intervention ARespOut vote, sources the requested cache line on local interconnect 16 in response to receipt of a Modified intervention ARespIn vote, and updates the coherency state of its copy of the requested cache line to Shared state. If, on the other hand, a snooping cache hierarchy 14 holds a requested cache line in Shared or Invalid state, the snooping cache hierarchy 14 supplies the appropriate ARespOut vote (i.e., Shared or Null, respectively) and does not source the requested cache line.

For those states and operations not shown in Tables VII and VIII, coherency state transitions and coherency responses of cache hierarchies 14 are handled in accordance with the prior art MESI protocol, with the Recent state being treated like the Shared state.

Coherence Protocol Behavior of Node Controller

The coherence behavior of a node controllers 20 in response to read-type transactions for which shared intervention is enabled depends upon the location of the requesting cache hierarchy 14 and the node controller 20 of interest with respect to the home node of the requested cache line. In general, four different request scenarios are possible in a NUMA computer system:

(1) a request by a processor at the home node of the requested cache line is received by the home node's node controller;

(2) a request by a processor at a remote node is received by the node controller of the requested cache line's home node;

(3) a request by a processor at a remote node (with respect to the cache line) is received by the node controller of the processor's own node; and (4) a request by a processor at a remote node is received by a node controller at a remote node.

Table IX, below, summarizes the behavior of a node controller in the first scenario listed above in response to receipt of a READ transaction. As shown, when a READ transaction is received from a local processor 10 by the home node's node controller 20 and the requested cache line is indicated as Modified at a remote processing node 8 in coherence directory 50, node controller 20 votes ARespOut ReRun and forwards the READ transaction to the indicated remote processing node 8 with intervention enabled (i.e., N=1) in response to receipt of an ARespIn ReRun vote from arbiter 24. If the requested cache line is valid (Modified or Exclusive) at the remote processing node 8, the remote processing node 8 will supply the updated copy of the requested cache line to node controller 20 by modified or shared intervention; otherwise (i.e., the requested cache line is invalid at the remote processing node 8), the remote processing node 8 will provide a Null response to node controller 20.

In either event, node controller 20 will request the local processor 10 to reissue the READ transaction. In response to receipt of the reissued READ transaction, node controller 20 votes ARespOut Modified Intervention (MI) if the cache line was sourced by Modified intervention, votes ARespOut Shared Intervention (SI) if the requested cache line was sourced by Shared intervention, and votes Null otherwise. If node controller 20 receives an ARespIn MI or SI vote for the reissued READ transaction (R=1), node controller 20 sources the requested cache line on local interconnect 16 and updates the coherence state of the requested cache line in coherence directory 50 to Shared. Alternatively, if arbiter 24 issues an ARespIn Null vote, system memory 18 sources the requested cache line to the requesting processor 10, and node controller updates the coherence state of the requested cache line to Invalid. System memory 18 similarly sources the requested cache line if the requested cache line is indicated as Shared or Invalid in coherence directory 50 and the ARespIn vote is Shared or Null. In these cases, however, the READ transaction is not forwarded to any remote processing node 8.

TABLE IX

| Directory State | ARespOut (R=0/R=1) | ARespIn (R=0) | ARespIn (R=1) | Node IC trans. |
|---|---|---|---|---|
| M→S | ReRun/SI, MI | ReRun | SI, MI | Read (N=1) |
| M→I | ReRun/Null | ReRun | Null | Read (N=1) |
| S | Shared | Shared | na | na |

The operation of node controller 20 in response to receipt of a RWITM transaction is the same as that shown in Table IX, with the following differences. First, the coherency state of the requested cache line in coherence directory 50 is updated to or remains Invalid in all cases. Second, a RWITM transaction, rather than a READ, is forwarded by the node controller 20 to the remote processing node 8, if any, indicated in coherence directory 50 as holding the requested cache line in Modified state. Third, if the requested cache line is indicated in coherence directory 50 as Shared at a remote processing node 8, node controller 20 issues a DClaim transaction to the remote processing node 8 to invalidate the copy of the requested cache line at the remote processing node 8.

Referring now to Table X, below, the operations of a node controller are summarized in the second scenario in which a READ transaction by a processor at a remote node is received via node interconnect 22 by the node controller 20 of the requested cache line's home node. As indicated, if the requested cache line is indicated in coherence directory 50 as Invalid at the requesting processing node 8, node controller 20 votes Null during the ARespOut period and, in response to receipt of an SI or Null ARespIn vote and subsequently the requested cache line, supplies the requested cache line to the requesting processing node 8. Node controller 20 also updates the state of the cache line in coherence directory 50 from Invalid to Shared. Node controller 20 behaves similarly if the requested cache line is indicated as Shared at the requesting processing node 8, but does not update the coherence state of the cache line.

As shown in the third through fifth rows of Table X, node controller 20 must perform additional operations if the requested cache line in indicated in coherence directory 50 as Modified at a third node that is different that the home node and the requesting processing node 8. In particular, node controller 20 votes ARespOut ReRun to cause the first local READ transaction (R=0) to be reissued at a later time. Then, node controller 20 forwards the READ transaction to the third node to ascertain whether or not the requested cache line has been modified at the third node. Due to the imprecision of the coherence protocol utilized by coherence directory 50, three possibilities exist: (1) the requested cache line has been modified at the third node (fourth row); (2) the requested cache line is held in Exclusive state at the third node (third row); or (3) the requested cache line is Invalid at the third node (fifth row). If the requested cache line is Modified or Exclusive at the third node, the third node sources the requested cache line to node controller 20 by intervention; otherwise, the third node responds to the forwarded READ transaction with a Null response. When node controller 20 reissues the READ transaction at the home node (R=1), node controller 20 votes ARespIn Modified Intervention (MI), SI, or Null, depending upon the response received from the third node. Node controller 20 then sources the requested cache line to the requesting processing node 8 in response to either an ARespIn MI or SI, or alternatively, forwards a copy of the requested cache line received from the home node's system memory 18 in response to an ARespIn Null vote. Node controller 20 also updates the coherence state of the requested cache line in coherence directory 50 from Modified to Shared, if the requested cache line is valid at the third node, and from Modified to Invalid, if the requested cache line is Invalid at the third node.

TABLE X

| Directory State | ARespOut (R=0/R=1) | ARespIn (R=0) | ARespIn (R=1) | Node IC trans. |
|---|---|---|---|---|
| I→S | Null | SI or Null | na | na |
| S | S | SI, S | na | na |
| M→S | ReRun/SI | ReRun | SI | Read (N=1) |
| M→S | ReRun/MI | ReRun | MI | Read (N=1) |
| M→I | ReRun/Null | ReRun | Null | Read (N=1) |

If the read-type transaction received at node controller 20 were a RWITM transaction rather than a READ transaction, the operations of node controller 20 would be much the same as those outlined in Table X, with the following differences. In the first two rows, the coherence state in memory directory 50 would be updated to Modified, and in the third through fifth rows, the coherence state would be updated to Invalid in all three cases. In the third through fifth rows, the transaction issued on node interconnect 22 to the third node would also be a RWITM transaction rather than a READ.

With reference now to Table XI, below, the operations of a node controller are summarized for the third scenario in which a READ transaction by a processor at a remote node (with respect to the requested cache line) is received via local interconnect 16 by the node controller 20 of the requesting processor's node. Table XI does not indicate possible coherence state transitions of the requested cache line since only the coherence directory 50 at the home node tracks the coherence state.

As indicated in the first column of Table XI, node controller 20 votes ReRun ARespOut in each operating scenario to indicate that the requested cache line falls within the physical memory space allocated to a different processing node 8. Unless the READ transaction can be serviced locally by shared or modified intervention, as shown in the sixth row, arbiter 24 votes ARespIn ReRun, and node controller 20 forwards the READ transaction to the home node of the requested cache line. The home node then provides node controller 20 with the final coherency response to the READ transaction at the home node, together with the requested cache line if the coherency response is other than Retry. When the READ request is reissued at the requesting processing node 8, node controller 20 provides the coherency response received from the home node during the ARespOut period, and then supplies the requested cache line if the ARespIn vote is other than Retry. It should also be noted that the operations for a RWITM transaction would be the same as those given in Table XI, except that the transaction forwarded to the home node in each of the first through fifth rows would be a RWITM transaction.

TABLE XI

| ARespOut (R=0/R=1) | ARespIn (R=0) | ARespIn (R=1) | Node IC trans. |
| --- | --- | --- | --- |
| ReRun/Null | ReRun | Null | Read (N=1) |
| ReRun/S | ReRun | S | Read (N=1) |
| ReRun/SI | ReRun | SI | Read (N=1) |
| ReRun/MI | ReRun | MI | Read (N=1) |
| ReRun/Retry | ReRun | Retry | Read (N=1) |
| ReRun | SI or MI | na | na |

Finally, referring to Table XII, below, the operations of a node controller 20 are summarized in a fourth scenario in which the requesting processor 10 and the node controller 20 both reside at a remote (third) node with respect to the home node of a cache line specified in a READ transaction. As shown, the node controller 20 votes ARespOut Null in response to any READ transaction run on its local interconnect 16 that requests a cache line having another node as its home node. Node controller 20 forwards the ARespIn vote received by the READ transaction to the home node, and also supplies the requested cache line if the local ARespIn vote is Modified Intervention or Shared Intervention. If the read-type transaction were a RWITM transaction, the operations of node controller 20 would be the same as those shown in Table XII.

TABLE XII

| ARespOut | ARespIn |
| --- | --- |
| Null | Null, S |
| Null | SI, MI |

As has been described, the present invention provides a NUMA computer system that advantageously reduces the number of inter-node read requests and reduces the latency of read requests by supporting shared intervention of data. According to the present invention, each processing node may have a snooper (e.g., cache hierarchy) that holds the same cache line in a non-exclusive Recent state from which that snooper can source the cache line by shared intervention. Importantly, sourcing a cache line by shared intervention at a processing node frequently does not require any notification of other processing nodes or transaction forwarding via the node interconnect.

While the invention has been particularly shown and described with reference to a preferred embodiment, it will be understood by those skilled in the art that various changes in form and detail may be made therein without departing from the spirit and scope of the invention.

What is claimed is:

1. A computer system comprising:

a node interconnect;

first and second processing nodes that are each coupled to said node interconnect, wherein said first processing node includes a system memory and a first processor and a second processor that each have a respective one of a first cache hierarchy and a second cache hierarchy, said first and second cache hierarchies being coupled by a local interconnect, and wherein said second processing node includes at least a system memory and a third processor having a third cache hierarchy;

wherein each of said first cache hierarchy and said third cache hierarchy concurrently store an unmodified copy of a particular cache line in a Recent coherency state due to receiving at said second processing node a read request for a copy of said particular cache line from said first cache hierarchy, wherein said copy of said particular cache line can be sourced by shared intervention from both said first cache hierarchy and said third cache hierarchy, and wherein said first cache hierarchy sources a copy of said particular cache line to said second cache hierarchy by shared intervention in response to a read request by said second cache hierarchy utilizing communication on only said local interconnect and without communication on said node interconnect.

2. The computer system of claim 1, wherein if said first cache hierarchy stores an unmodified copy of a selected cache line, said first cache hierarchy sources a copy of said selected cache line by shared intervention in response to a read-with-intent-to-modify request only if said selected cache line is held by said first cache hierarchy in Exclusive state.

3. The computer system of claim 1, each of said first and second processing nodes including a node controller connected to said node interconnect, each node controller having a coherence directory indicating possible coherence states of remotely held cache lines for which a processing node containing that node controller is a home node.

4. The computer system of claim 3, wherein each coherence directory utilizes a single coherence state to track cache lines that are possibly held remotely in either Shared state or Recent state.

5. The computer system of claim 3, and further comprising a node controller coupled to said local interconnect of said first processing node and said node interconnect, wherein said node controller at said first processing node forwards a request for a cache line for which said first processing node is a home node to said second processing node only if said coherence directory of said node controller of said first processing node indicates said requested cache line is modified at said second processing node.

6. A method of communication in a computer system including first and second processing nodes each coupled to a node interconnect, wherein said first processing node includes a system memory and a first processor and a second processor that each have a respective one of a first cache hierarchy and a second each hierarchy, said first and second cache hierarchies being coupled by a local interconnect, and wherein said second processing node includes at least a system memory and a third processor having a third cache hierarchy, said method comprising:

concurrently storing within said first cache hierarchy and said third cache hierarchy, an unmodified copy of a particular cache line in a Recent coherency state due to receiving at said second processing node a read request for a copy of said particular cache line from said first cache hierarchy, wherein said copy of said particular cache line can be sourced by shared intervention from both said first cache hierarchy and said third cache hierarchy; and in response to a read request by said second cache hierarchy, said first cache hierarchy sources a copy of said particular cache line to said second cache hierarchy by shared intervention utilizing communication on only said local interconnect and without communication on said node interconnect.

7. The method of claim 6, and further comprising:

storing an unmodified copy of a selected cache line in said first cache hierarchy; and in response to a read-with-intent-to-modify request, sourcing a copy of said selected cache line from said first cache hierarchy cache line by shared intervention only if said selected cache line is held in Exclusive state.

8. The method of claim 6, each of said first and second processing nodes including a node controller connected to said node interconnect, each node controller having a coherence directory, said method further comprising:

indicating, within the coherence directory of each node controller, possible coherence states of remotely held cache lines for which a processing node containing that node controller is a home node.

9. The method of claim 8, and further comprising:

within each coherence directory, utilizing a single coherence state to track cache lines possibly held remotely in either Shared state or Recent state.

10. The method of claim 8, and further comprising:

forwarding a request for a cache line for which said first processing node is a home node from a node controller at said first processing node to said second processing node only if said coherence directory of said node controller of said first processing node indicates said requested cache line is modified at said second processing node.

* * * * *

UNITED STATES PATENT AND TRADEMARK OFFICE
CERTIFICATE OF CORRECTION

PATENT NO.  : 6,115,804
DATED       : September 5, 2000
INVENTOR(S) : Carpenter

It is certified that error appears in the above-identified patent and that said Letters Patent is hereby corrected as shown below:

<u>Column 14,</u>
Line 59, please replace "each" with -- cache --.

Signed and Sealed this

Eighteenth Day of September, 2001

*Attest:*

NICHOLAS P. GODICI
*Attesting Officer*    *Acting Director of the United States Patent and Trademark Office*